M. MAURER.
RECORDING AND REGISTERING ATTACHMENT FOR WEIGHING SCALES.
APPLICATION FILED MAR. 10, 1910.
986,640.
Patented Mar. 14, 1911.
4 SHEETS—SHEET 1.
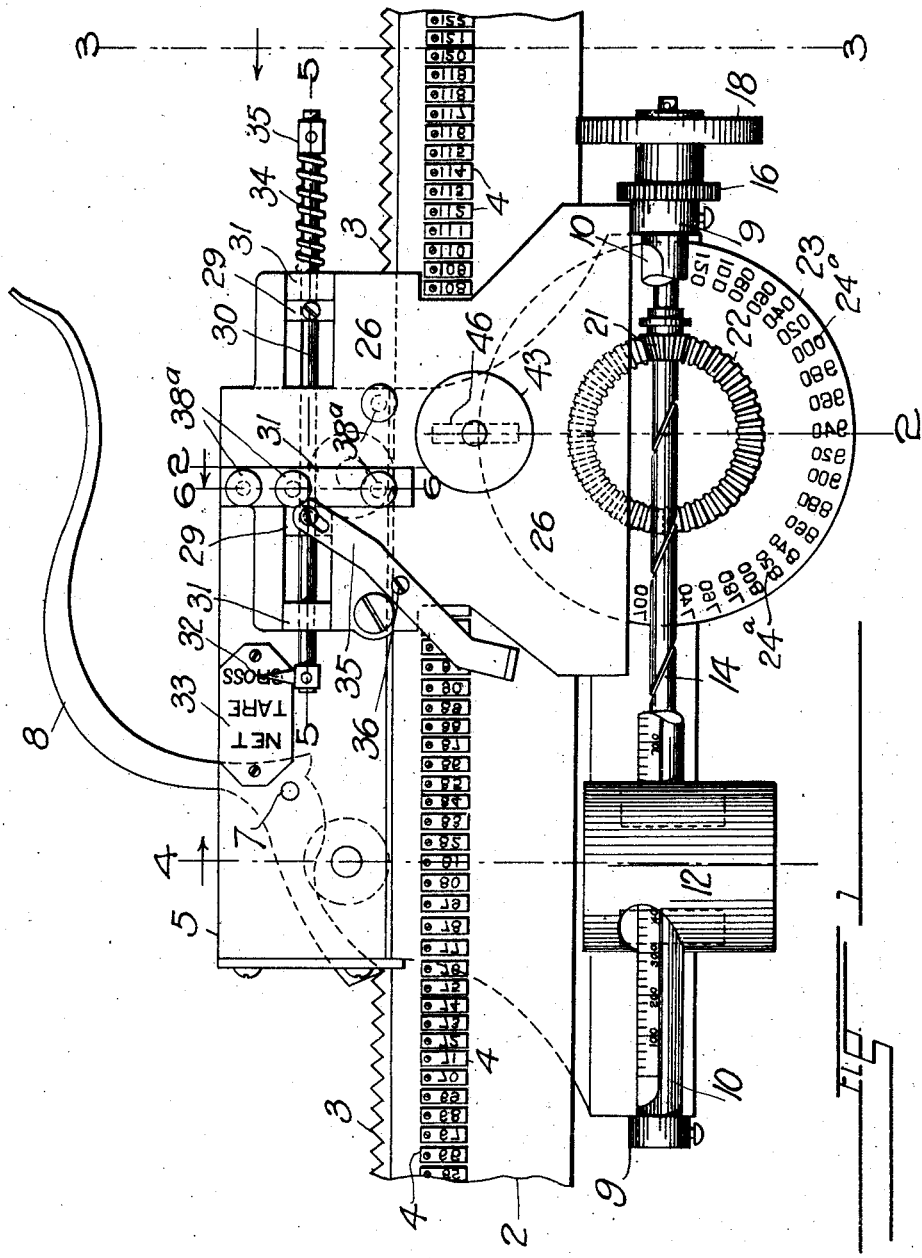
WITNESSES:
M. L. Geary
F. H. Amo
INVENTOR.
M. Maurer
BY
ATTORNEY.

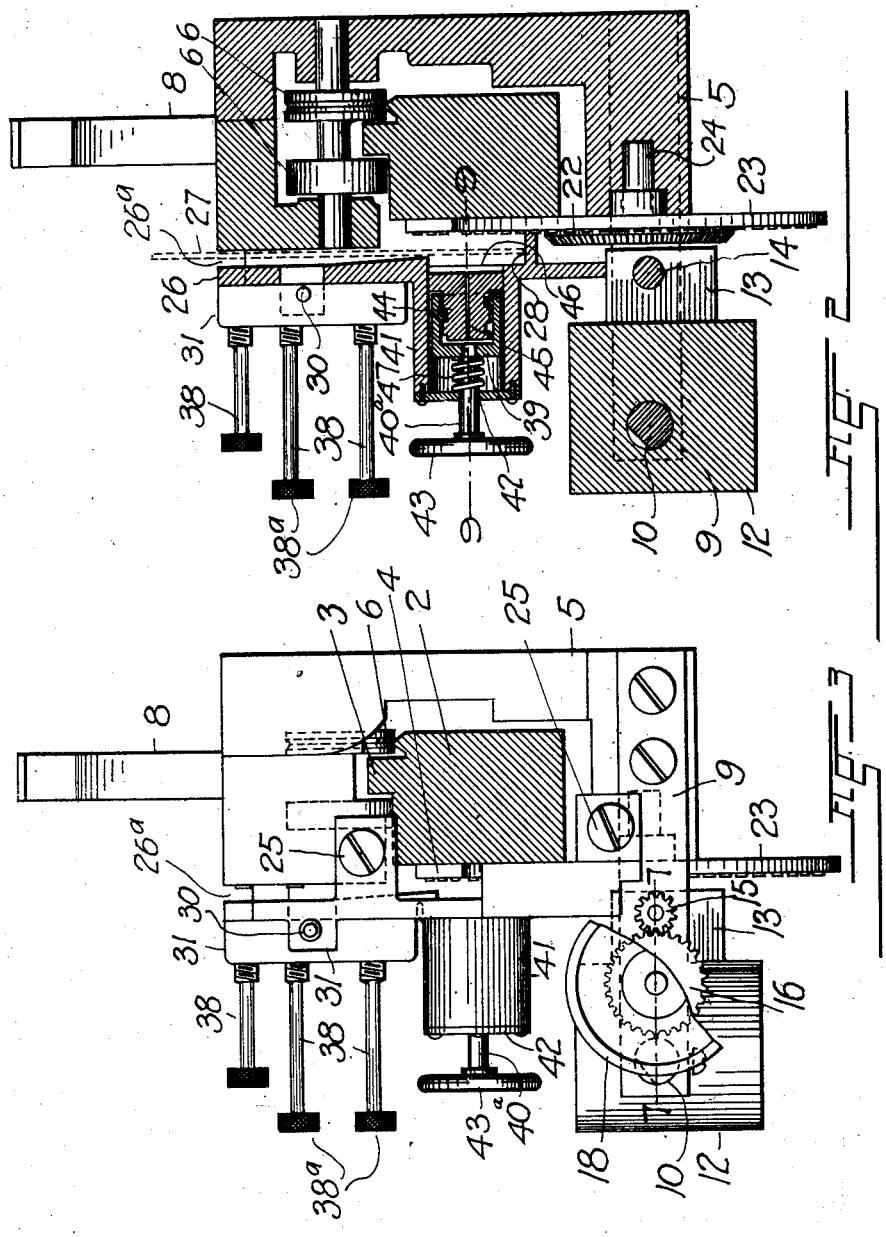

M. MAURER.
RECORDING AND REGISTERING ATTACHMENT FOR WEIGHING SCALES.
APPLICATION FILED MAR. 10, 1910.
986,640.
Patented Mar. 14, 1911.
4 SHEETS—SHEET 3.
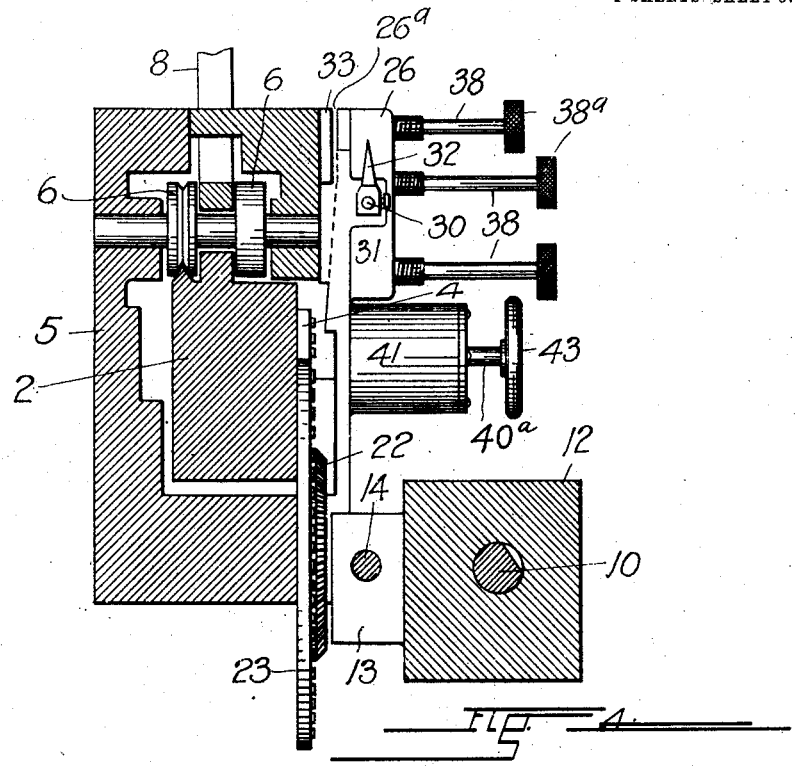
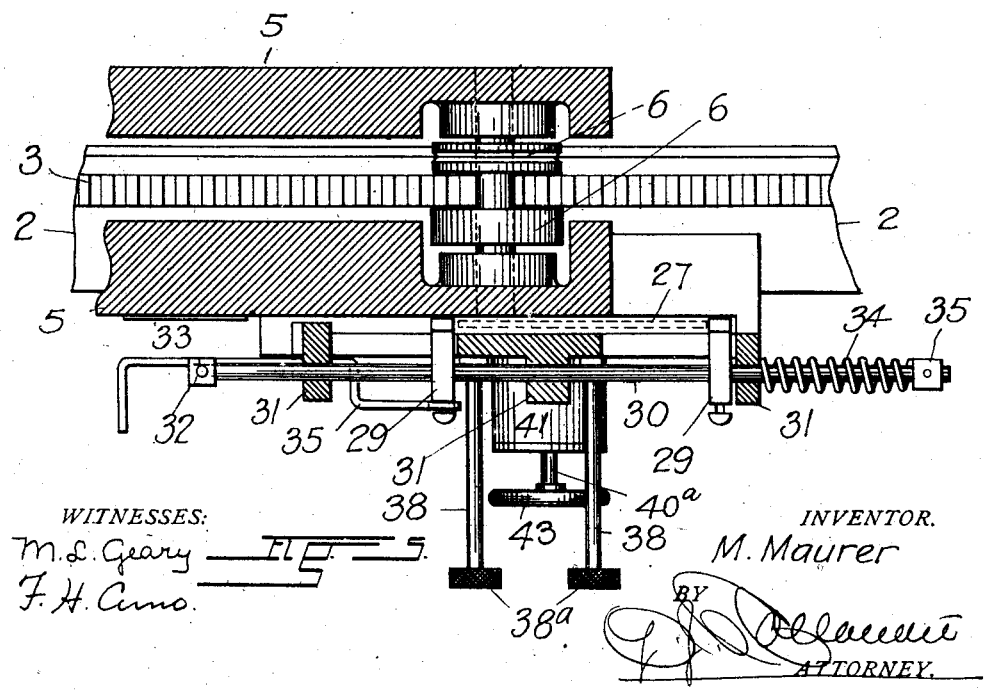
WITNESSES:
M. L. Geary
F. H. Arno.
INVENTOR.
M. Maurer
BY
ATTORNEY.

M. MAURER.
RECORDING AND REGISTERING ATTACHMENT FOR WEIGHING SCALES.
APPLICATION FILED MAR. 10, 1910.
986,640.
Patented Mar. 14, 1911.
4 SHEETS—SHEET 4.
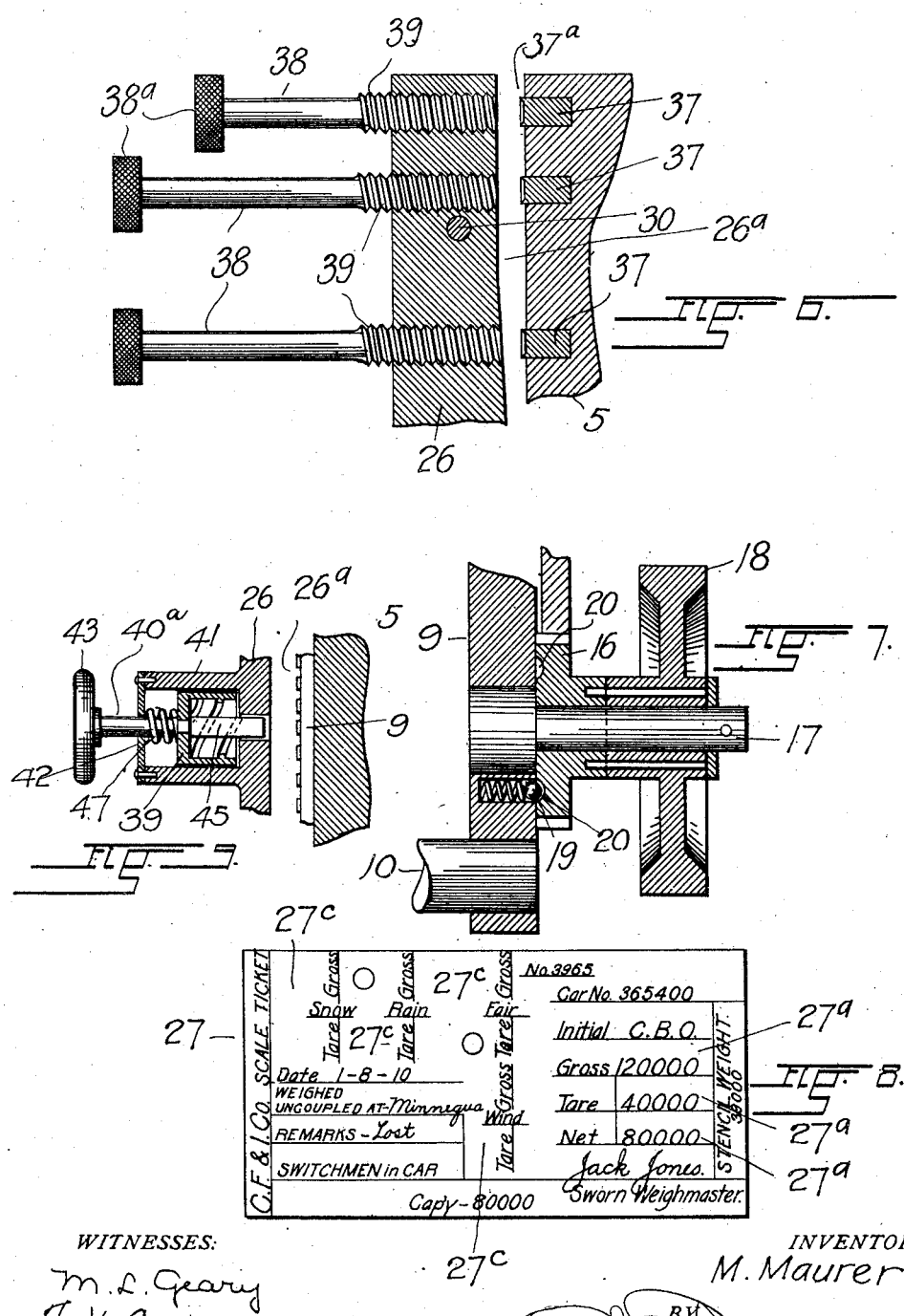

UNITED STATES PATENT OFFICE.

MARTIN MAURER, OF PUEBLO, COLORADO.

RECORDING AND REGISTERING ATTACHMENT FOR WEIGHING-SCALES.

986,640.  Specification of Letters Patent.  Patented Mar. 14, 1911.

Application filed March 10, 1910. Serial No. 548,473.

*To all whom it may concern:*

Be it known that I, MARTIN MAURER, a citizen of the United States of America, residing at Pueblo, in the county of Pueblo and State of Colorado, have invented certain new and useful Improvements in Recording and Registering Attachments for Weighing-Scales, of which the following is a specification.

This invention relates to new and useful improvements in recording and registering attachments for weighing scales of the type in which a sliding poise on a main scale beam, carries an auxiliary beam and a therewith adjustably associated auxiliary poise, and the principal object of my invention resides in the provision of a simple mechanism whereby, when by movement of the poises, the load on the scale is balanced, printing types respectively denoting in thousands and hundreds of pounds the weight of the load as indicated by the position of the poises on their respective beams, are automatically brought in register and in operative relation to a suitable mechanism by the use of which they are impressed upon one or more tickets inserted in a carrier provided for the purpose.

Further objects of my invention reside in the provision of a simple adjusting mechanism whereby the gross, tare and net weights of a load may be separately printed in designated spaces upon the same ticket; in providing means whereby the condition of the weather, while the weighing process is carried on, may be indicated on the ticket; in constructing the plunger by means of which the impressions are produced, of separate dies which, while operating conjunctly, are individually self-adjusting to compensate for any difference in the height of the two types which jointly denote the weight of the load, and in detachably and separately securing the type bars upon the scale beam, whereby, in case of wear or damage, they may be readily renewed. It will furthermore be observed that the construction, as hereinafter to be described, provides a common abutting surface for the two types while the impression is being made, thereby insuring their proper position relative to each ᴏᴛher, that by the rotatory movement of the vice employed to produce the impressions, ⸱ring or displacement of any of the parts ⸱rised in the scale mechanism, is avoided, and that my attachment may readily be applied to beams of scales already in use.

With the above general objects in view, and others as hereinafter appear, the invention consists in certain novel features of construction, as shown in the accompanying drawings in the various views of which like parts are similarly designated and in which—

Figure 1, represents a face view of a portion of the main scale-beam and the poise supported thereon with my improved mechanism in its operative position, Fig. 2, a transverse section taken along the line 2—2 Fig. 1, Fig. 3, a transverse section along the line 3—3 Fig. 1, Fig. 4, a similar section taken along the line 4—4 Fig. 1, Fig. 5, a horizontal section along the line 5—5 Fig. 1, Fig. 6, an enlarged, fragmentary section along the line 6—6 Fig. 1, Fig. 7, an enlarged, fragmentary section along the line 7—7 Fig. 3, Fig. 8, a face-view of the ticket upon which the weights and weather conditions have been recorded by the use of my invention and Fig. 9, a section taken along the line 9—9 Fig. 2.

Referring to the drawings by numerical reference characters, let the numeral 2 designate the main scale beam formed in its upper edge with graduation-notches 3, which are spaced to indicate in thousands the weight of the load upon the scale.

Detachably secured upon the face of the beam, by means of pins, screws or other fastening devices, and in vertical alinement with the respective notches 3, are the type-bars 4 which bear, in relief, numerals for use in printing, indicative of the weight in thousands represented by the respective notches with which they are alined. Slidably mounted upon the beam 2, is the main poise 5 which, as usual, is carried upon antifriction rollers 6 and is composed of two sections which are riveted or bolted together. Pivoted as at 7, in the upper part of the poise, is a stop-dog 8 which is designed to accurately hold the poise in its adjusted position by successive engagement with the notches 3.

Rigidly secured between the extremities of two parallel arms 9 which project forwardly from the sides of the poise at its lower portion, is the auxiliary scale beam 10 which is graduated to indicate hundreds of pounds or fractions thereof and upon which the auxiliary poise 12 is slidably mounted.

The poise 12 is formed with two parallel, rearwardly extending ears 13 which are provided with axially alined, threaded apertures for the reception of an endless feed-screw 14 which is revolubly mounted in corresponding openings in the two arms 9. A pinion 15 secured upon an extremity of the screw 14 which projects beyond the respective supporting arm 9, meshes with a spur-wheel 16 which is revolubly mounted upon a stud 17, projecting from the said arm, in coöperative connection with a hand-wheel 18.

To enable the operator to approximately determine the extent of the movement of the poise 12 on the auxiliary beam 10, without reference to the latter's graduated scale, a click is provided which is preferably composed of a spring-held ball 19 movably disposed in a recess of the arm 9 to register with any one of a series of equidistantly arranged concavities 20 in the face of the gear wheel 16, (see Fig. 7). The feed screw 14 is furthermore provided with a beveled pinion 21 which meshes with a corresponding gear 22 formed on the face of a therewith concentric disk 23 which is revolubly mounted upon a steel pin 24 which projects forwardly from the lower portion of the poise 5, axially in a plane with the feed screw 14.

The disk 23 is formed upon its face near its peripheral edge, with a series of radially disposed, relief numbers 24ª which, ranging from 000 to 980, correspond in number and consecutive arrangement with the graduations on the scale beam 10. The outer ends of the numbers 24ª are arranged in close proximity to the peripheral edge of the disk 23, and the said edge moves during the rotatory movement of the disk, contiguous to the line in which the lower ends of the type bars 4 terminate, while the thickness of the disk is substantially equal to that of the said bars, with the result that when the uppermost type on the disk 23 registers with the type bar 4, which at the time is in vertical alinement with the center of the said disk, impressions of the two types may be simultaneously produced upon a juxtaposed ticket, so as to appear thereon as one continuous series of numerical characters. As the distance between each two consecutive types on the face of the disk 23 is necessarily greater than that between two consecutive graduations on the beam 10, I have proportioned the gearing employed in the transmission of the movement of the handwheel 18 to the disk 23 and to the poise 12, so that the extent of their respective movements shall be proportionate to the difference in the distances between the numerals 24ª and the graduations on the beam 10.

In the construction shown in the drawings, the type-bars contained in one quarter of a circle on the disk 23 correspond with the graduations in one and one quarter inches on the beam 10. The ratio between the spur wheels 16 and 15 is as 2 to 1, that between the bevel gears 22 and 21, as 4 to 1 and the pitch of the feed-screw 14 is one and one quarter inches, so that half a revolution of the handwheel 18, will cause an entire revolution of the feed screw which produces a linear movement of the poise 12 of one and one quarter inches and a simultaneous rotatory movement of the disk through a quadrant. Rigidly secured by means of screws 25 in spaced relation to the face of the main beam 5, is a plate 26 which carries the impression mechanism and the ticket adjusting appliance, included in my invention. The tickets 27 upon which the impressions are produced, are in practice inserted in the space 26ª between the plate 26 and the faces of the beam 25 and the disk 23 and they are supported upon a stop 28 which projects inwardly from the said plate and terminates in close proximity to the face of the said disk. The position of the ticket with relation to the poise is furthermore determined by two stops 29 adjustably mounted on an indicator-rod 30 which is longitudinally slidably supported in a series of apertured lugs 31 which project forwardly from the plate 26.

The rod 30 carries at one of its extremities an upwardly extending pointer 32 which by its position relative to a plate 33 fastened upon the face of the poise 5, indicates the position of the ticket relative to the registering types on the beam 2 and the disk 23. Displayed upon the plate 33 are the words "Net", "Tare" and "Gross" and these same words are printed on the tickets 27 at corresponding distances from each other so that when the impression of the types on the beams and the disk is made, it will appear on the ticket in proximity to the same word indicated on the face of the poise by the pointer 32, as is shown in Fig. 8 of the drawings. A coiled spring 34 which surrounds the extreme portion of the rod opposite to that which carries the pointer, engages the adjacent lug 31 and a collar 35 on the rod for the purpose of resiliently maintaining the latter in its normal position in which the pointer 32 registers with the word "Gross" on the plate 33. A lever 35 fulcrumed upon the plate 26, as at 36, is pivotally connected with one of the stops 29, to facilitate the adjustment of the indicator-rod 30.

As the operation of a scale of the class to which my invention appertains, is frequently influenced by the conditions of the weather I have provided means whereby the atmospheric conditions may be indicated upon the ticket in properly designated spaces, provided for the purpose.

The means above referred to consists of four sets of dies, the members of which applied on the plate 26 and the oppoportion of the poise 5 at places corresponding with the spaces on the ticket which, as shown in Fig. 8 of the drawings, are respectively indicated by the words "Snow", "Rain", "Wind" and "Fair".

Each of the stationary members 37 which are driven into corresponding recesses of the poise 5, as is illustrated in Fig. 6, is formed at its outer extremity, which projects beyond the surface of said poise, with a circular ridge, 37$^a$, while the corresponding, movable die members are each composed of a screw plunger 38, one end of which is flat to engage the ridge on the respective member 37 while its opposite extremity is provided with a milled head 38$^a$ to facilitate manipulation. The plungers are formed with screw threads, as at 39, to coöperatively engage corresponding threads in openings 40, formed in enlarged portions of the plate 26, so that by rotation of the plungers, their flat extremities may be brought in engagement with the protruding circular ridges 37$^a$ on the respective members 37.

The impressions mechanism by means of which the weight indicated by the registering types on the beam 2 and the disk 23, is imprinted upon the ticket or tickets inserted in the space 26$^a$, is composed of a nut 39 secured upon the extremity of a stem 40$^a$ and rotatably and longitudinally movably fitted in a hollow cylindrical, forwardly projecting boss 41 on the plate 26, closed at its outer end by means of a centrally apertured plate 42 through which projects the stem 40$^a$ whose outer extremity is provided with a hand wheel 43. The nut 39 is formed upon its interior surface with a left hand screw-thread, which operatively engages corresponding teeth on the opposite outer edges of two separate members 44 and 45 of a composite die, the protruding heads of which are slidably fitted in a slot 46 of the plate 26, which communicates with the interior of the boss 41. A coiled spring 47 applied between the nut 39 and the cover 42, serves to resiliently maintain the parts in their normal position. When, by manipulation of the handwheel 43, the nut is rotated, the die members 44 and 45 whose faces extend, respectively, opposite the vertically alined types on the beam 3 and the disk 5, are forced outwardly against the said types, to produce an impression thereof upon the interposed ticket or tickets.

In case the faces of the two types do not extend in the same vertical plane, as may occur as a result of imperfections in the parts with which they are associated, the independent operation of the two members of the composite die, the play between the coöperative screwthreads and the longitudinal movement of the nut against the spring 47, will jointly, cause a compensative displacement of the die members with the result that the impressions produced by the two types upon the ticket will at all times be clear and distinct.

Having thus described the mechanical construction of my invention, I will now proceed to explain its operation. The ticket 27, as shown in Fig. 8 of the drawings, is divided by printing upon its face, into a number of properly designated spaces part of which are filled in, in writing, by the operator in charge of the scale, while the others are designed to receive the impressions produced in the operation of my invention. Of the latter, those indicating the weight, (27$^a$) occupy the lower portion of the ticket, and are arranged in a transverse column and respectively designated by the words "Gross", "Tare" and "Net" the distances between which correspond with those between the same words on the plate 33 of the poise 5. The spaces 27$^c$ intended to receive the circular impressions of the die members 37 produced by means of the plungers 38, are arranged to correspond in position with the said members 37, when the ticket is in place in the space 26$^a$, and they are indicated respectively by the words "Snow", "Rain", "Fair" and "Wind", each in association with the words "Tare" and "Gross" which latter words are spaced the same as the corresponding words on the lower portion of the ticket or on the plate 33. When the load to be weighed is placed upon the scale, the two poises which, at the initial point of the operation, were set at zero, are consecutively moved along their respective beams. First the poise 5 is moved until, by the increased leverage, the beam 3 is almost moved about its fulcrum, after which the auxiliary poise 12 is moved along the cylindrical beam 10 by manipulation of the hand-wheel 18, until the load is balanced. When the parts are in this position, the type-bar 4, opposite the slot 46 in the plate 26, designates the greater part of the weight of the load in thousands of pounds, while the type on the disk 23, (which latter was rotated in accordance with the movement of the poise 12 as hereinbefore explained) which is vertically alined with the said bar 4, denotes the remainder of the weight in hundreds of pounds and fractions thereof. The tickets 27, two or more in number, together with interposed sheets of carbon paper, are now inserted in the space 26$^a$ in between the stops 29 on the indicator rod 30 and upon the stop 28 which projects inwardly from the plate 26. The rod 30 is moved longitudinally by means of the lever 35, to adjust the position of the tickets relative to the alined types, in accordance with the character of the load being weighed (either gross or tare) and the dies 44 and 45 are subsequently impelled against the respective types by manipulation of the hand-wheel 43. Before the ticket is removed or the rod 30 is returned to its normal position, the condition of the weather while the operation was carried on, is recorded on the tickets by rotating one of the plungers 38. After the tare and gross weights have been designated on the tickets in the above described manner, the operator moves the rod 30 to the "net" position. Having subtracted the tare weight from the gross weights, he moves the poises 5 and 12 on their respective beams until they register with the graduations conjunctly corresponding with the result of his calculation, after which he again produces an impression of the registering types on the beam 2 and the disk 23 by means of the mechanism provided for that purpose.

The last described step in the operation of the invention, while not absolutely essential, is desirable inasmuch as it insures a uniform, neat appearance of the tickets and averts possible mistakes by reason of indistinct handwriting.

While my invention is applicable to all classes of scales, it is more especially adapted for railroad track scales; its compact and simple construction makes it possible to apply it to scales already in use by merely attaching the type-bars 4 upon the face of the beam and substituting a poise constructed in accordance with my invention, for that previously employed, and the adjusting and impression mechanisms included in my invention, will, when properly operated, serve to produce a permanent and accurate record not only of the gross, tare and net weights of a load but also of the weather conditions while the same is being weighed.

Having thus described my invention what I claim and desire to secure by Letters Patent is:

1. A registering and recording attachment for weighing scales comprising in combination with a scale beam, a main poise movably mounted thereon, printing numerals on the face of the beam, an auxiliary graduated beam carried by the said poise, an auxiliary poise slidable on the said auxiliary beam, a disk rotatable on the said main poise contiguous to the face of the scale beam, about a relatively transverse axis, the said disk having on its face printing types corresponding to the graduations on the auxiliary scale and disposed in a plane with the type on the scale beam, a device constructed to print simultaneously from one of the type bars on the scale beam and a therewith vertically alined type on the disk and a mechanism constructed to operate the said disk and the said auxiliary poise conjunctly.

2. A registering and recording attachment for weighing scales, comprising in combination with a scale beam having a series of printing numerals corresponding to its graduations, a main poise slidable on the said beam, an auxiliary poise slidable on the main poise, a disk rotatable on the latter and carrying type whose faces are in a plane with those of the type on the scale beam, a device constructed to print simultaneously from alined types on the scale beam and the disk, and a mechanism for moving said auxiliary poise and said disk simultaneously at different rates of speed.

3. A registering and recording attachment for weighing scales, comprising in combination with a main scale beam having a series of printing numerals corresponding to its graduations, a main poise slidable on the said beam, an auxiliary scale beam carried on the said poise, an auxiliary poise slidable on the auxiliary beam, a disk rotatable on the main poise and carrying types corresponding to the graduations on the auxiliary beam, their faces being in a plane with those of the printing numerals on the main beam, a device for printing simultaneously from alined types on the main beam and the disk, an endless screw operatively engaging the said auxiliary poise and coactive gear wheels respectively on the said disk and the said screw.

4. A registering and recording attachment for weighing scales, comprising in combination with a main scale beam having a series of printing numerals corresponding to its graduations, a main poise slidable on the said beam, an auxiliary scale beam carried on the said poise, an auxiliary poise slidable on the auxiliary beam, a disk rotatable on the main poise and carrying types corresponding to the graduations on the auxiliary beam, their faces being in a plane with those of the printing numerals on the main beam, a device for printing simultaneously from alined types on the main beam and the disk, an endless screw operatively engaging the said auxiliary poise, and means for transmitting the movement of the said screw to the said disk, a rotatory handwheel and gearing for transmitting the movement of the said handwheel to the said screw at a different rate of velocity.

5. A registering and recording attachment for weighing scales comprising in combination with a main scale beam having a series of printing numerals corresponding to its graduations, a main poise slidable on the said beam, an auxiliary scale beam carried on the said poise, an auxiliary poise slidable on the auxiliary beam, a disk rotatable on the main poise and carrying types corresponding to the graduations on the auxiliary beam, their faces being in a plane with those of the printing numerals on the main beam, a device for printing simultaneously from alined types on the main beam and the disk, an endless screw operatively engaging the said auxiliary poise, means for transmitting the movement of the said screw to the said disk, a rotatory handwheel, gearing for transmitting the movement of the said handwheel to the said screw, and a click for determining the degree of rotation of the said handwheel, independent of the said graduated, auxiliary scale beam.

6. A registering and recording attachment for weighing scales comprising in combination with a main scale beam having a series of printing numerals corresponding to its graduations, a main poise slidable on the said beam, an auxiliary scale beam carried on the said poise, an auxiliary poise slidable on the auxiliary beam, a disk rotatable on the main poise and carrying types corresponding to the graduations on the auxiliary beam, their faces being in a plane with those of the printing numerals on the main beam, a device for printing simultaneously from alined types on the main beam and the disk, an endless screw operatively engaging the said auxiliary poise, means for transmitting the movement of the said screw to the said disk, and means for determining the degree of rotation of the said screw independent of the said graduated auxiliary scale beam.

7. A registering and recording attachment for weighing scales, comprising in combination with a main scale beam having printing numerals corresponding to its graduations, a main poise movably mounted on the beam, an auxiliary poise slidable on the main poise, a disk rotatable on the poise and carrying printing numerals whose faces move in a plane with those of the numerals on the main beam, means for moving the auxiliary poise and the disk simultaneously, and a device constructed to print from alined numerals on the main scale beam and the disk and comprising two independently self adjusting, conjunctly operating members disposed to separately engage the respective numerals.

8. A registering and recording attachment for weighing scales, comprising in combination with a main scale beam having printing numerals corresponding to its graduations, a main poise movably mounted on the beam, an auxiliary poise slidable on the main poise, a disk rotatable on the poise and carrying printing numerals whose faces move in a plane with those of the numerals on the main beam, means for moving the auxiliary poise and the disk simultaneously and a composite die constructed to print from alined numerals on the main scale beam and the disk and comprising a rotatory nut, and plunger members disposed to separately engage the respective numerals and independently in operative engagement with the screw thread of the said nut, whereby during rotation of the said nut the said members are impelled to move simultaneously and independently toward the said printing numerals.

9. A registering and recording attachment for weighing scales comprising in combination with a main scale beam having printing numerals corresponding to its graduations, a main poise movably mounted on the beam, an auxiliary poise slidable on the main poise, a disk rotatable on the poise and carrying printing numerals whose faces move in a plane with those of the numerals on the main beam, means for moving the auxiliary poise and the disk simultaneously, a composite die constructed to print from alined numerals on the main scale beam and the disk and comprising a rotatory nut, plunger members disposed to separately engage the respective numerals and independently in operative engagement with the screw thread of the said nut, whereby during rotation of the said nut, the said members are impelled to move simultaneously and independently toward the said printing numerals, and a spring disposed to resiliently hold the said nut against movement in the opposite direction.

10. A registering and recording attachment for weighing scales, comprising in combination with a scale beam having on its face a series of printing numerals corresponding to its graduations, a main poise slidable on the said beam, an auxiliary poise slidable on the said poise, a disk rotatable on the said main poise, contiguous to the face of the scale beam and carrying printing numerals whose faces are in a plane with those of the numerals on the beam, the said main poise having a pocket for the insertion of a ticket contiguous to the faces of the said printing numerals, a plunger constructed to move through a slot in the main poise communicating with the said pocket, whereby the said ticket may be pressed against alined numerals on the scale beam and the disk, registering with the said slot and a mechanism for moving the said auxiliary poise and the said disk simultaneously.

11. A registering and recording attachment for weighing scales comprising in combination with a scale beam having a series of printing numerals corresponding to its graduations, a poise slidable on the said beam and having a pocket for the insertion of a ticket contiguous to the said numerals, a device on the said poise, constructed to press a ticket inserted in said pocket, toward the numeral opposite thereto, and a sliding element including projections within the said pocket to engage opposite sides of a ticket inserted therein whereby its position may be varied laterally with respect to the said numeral.

12. A registering and recording attachment for weighing scales comprising in combination with a scale beam having a series of printing numerals corresponding to its graduations, a poise slidable on the said beam and having a pocket for the insertion of a ticket contiguous to the said numerals, a device on the said poise, constructed to press a ticket inserted in said pocket, toward the numeral opposite thereto, a rod longitudinally movable on the said poise, and stops adjustably mounted on the said rod and projecting into the said pocket to engage opposite sides of a ticket inserted therein.

13. A registering and recording attachment for weighing scales comprising in combination with a scale beam having a series of printing numerals corresponding to its graduations, a poise slidable on the said beam and having a pocket for the insertion of a ticket contiguous to the said numerals, a device on the said poise constructed to press a ticket inserted in said pocket, toward the numeral opposite thereto, a rod longitudinally movable on the said poise, stops adjustably mounted on the said rod and projecting into the said pocket to engage opposite sides of a ticket inserted therein, and a spring arranged to resiliently maintain said rod in its normal position.

14. A registering and recording attachment for weighing scales, comprising in combination with a scale beam having a series of printing numerals corresponding to its graduations, a poise slidable on the said beam and having a pocket for the insertion of a ticket contiguous to the said numerals, a device on the said poise, constructed to press a ticket inserted in said pocket, toward the numeral opposite thereto, a rod longitudinally movable on the said poise, a lever for operating said rod, and stops on the rod, projecting into the said pocket to engage opposite sides of a ticket inserted therein.

15. A registering and recording attachment for weighing scales, comprising in combination with a scale beam having a series of printing numerals corresponding to its graduations, a poise slidable on the said beam and having a pocket for the insertion of a ticket contiguous to the said numerals, a device on the said poise, constructed to press a ticket inserted in said pocket, toward the numeral opposite thereto, a rod longitudinally movable on the said poise, stops on the said rod projecting into the said pocket to engage opposite sides of a ticket inserted therein, and a pointer on the said rod to indicate by its position relative to designated points on the poise whether the weight of the load on the scale is net, tare or gross.

16. A registering and recording attachment for weighing scales comprising in combination with a scale beam having a series of printing numerals corresponding to its graduations, a poise slidable on the said beam and having a pocket for the insertion of a ticket contiguous to the said numerals, a device on the said poise constructed to press a ticket inserted in said pocket toward the numeral opposite thereto, and a plurality of separate devices on the poise adapted to produce impressions upon a ticket inserted in the said pocket separate from that taken from the numeral.

17. A registering and recording attachment for weighing scales comprising in combination with a scale beam having a series of printing numerals corresponding to its graduations, a poise slidable on the said beam and having a pocket for the insertion of a ticket contiguous to the said numerals, a device on the said poise, constructed to press a ticket inserted in said pocket, toward the numeral opposite thereto and a plurality of separate devices on the poise adapted to produce impressions upon a ticket inserted in the said pocket separate from that taken from the numeral and each comprising a die projecting into the said pocket, and an oppositely disposed plunger adapted to enter said pocket from the opposite side.

18. In combination, a ticket having upon its face designated spaces for recording atmospheric conditions, a scale beam having a series of printing numerals corresponding to its graduations, a poise slidable on said beam and having a pocket for the insertion of said ticket contiguous to the said numerals, a device on the poise constructed to press the ticket toward the numeral opposite thereto, and means on the poise to produce an impression separately in any one of the said spaces.

19. A registering and recording attachment for weighing scales comprising in combination with a scale beam having a series of printing numerals corresponding to its graduations, a poise slidable on the said beam and having a pocket for the insertion of a ticket contiguous to the said numerals, a device on the said poise, constructed to press a ticket inserted in said pocket, toward the numeral opposite thereto, means to adjust the position of the ticket in the pocket, and a plurality of devices on the poise adapted to produce impressions upon a ticket inserted in the pocket, separate from that taken from the numeral.

20. In combination, a ticket having upon its face designated spaces for recording atmospheric conditions each of the said spaces having two subdivisions, a scale beam having a series of printing numerals corresponding to its graduations, a poise slidable on said beam and having a pocket for the insertion of said ticket, a device on the poise constructed to press the ticket toward the numeral opposite thereto, means on the poise to produce an impression separately in any one of said spaces, and means for adjusting the position of the ticket in the pocket whereby one or the other of the said subdivisions may be brought in register with the said impression means.

21. A registering and recording attachment for weighing scales, comprising in combination with a scale beam, a poise slidable thereon, means for recording the weight of a load indicated by the position of the poise on the beam, on a ticket, and a stamping device on said poise separate from said means for producing an impression upon the ticket separate from that which records the weight.

22. A registering and recording attachment for weighing scales comprising in combination with a main scale beam having a series of printing numerals corresponding to its graduations, a main poise slidable on the said beam, an auxiliary scale beam carried on the said poise, an auxiliary poise slidable on the auxiliary beam, a disk rotatable on the main poise and carrying types corresponding to the graduations on the auxiliary beam, their faces being in a plane with those of the printing numerals on the main beam, a device for printing simultaneously from alined types on the main beam and the disk, an endless screw operatively engaging the said auxiliary poise, and means for transmitting the movement of the said screw to the said disk.

23. In a device of the class described, a scale beam having printing numerals on a substantially upright face thereof, a main poise movable on the beam, a wheel rotatable on the main poise, and having upon its face printing types disposed in a plane with the type on the scale beam, an auxiliary poise, a mechanism for moving said wheel in correspondence with the auxiliary poise, and a device constructed to print simultaneously from alined types on the scale beam and the wheel.

In testimony whereof I have affixed my signature in presence of two witnesses.

MARTIN MAURER.

Witnesses:
A. C. LARSEN,
S. M. THOMPSON.

Copies of this patent may be obtained for five cents each, by addressing the "Commissioner of Patents Washington, D. C."